ENERGY-PROJECTING AND SCANNING APPARATUS

Filed May 9, 1962 4 Sheets-Sheet 1

INVENTOR.
EMIK A. AVAKIAN
BY
Davis, Hoxie, Faithfull & Hapgood
ATTORNEYS.

INVENTOR.
EMIK A. AVAKIAN
BY
Davis, Hoxie, Faithfull & Hapgood
ATTORNEYS.

Nov. 1, 1966 E. A. AVAKIAN 3,283,147

ENERGY-PROJECTING AND SCANNING APPARATUS

Filed May 9, 1962 4 Sheets-Sheet 3

INVENTOR
EMIK A. AVAKIAN

BY
Davis, Hoxie, Faithfull & Hapgood
ATTORNEYS.

ENERGY-PROJECTING AND SCANNING APPARATUS

INVENTOR
EMIK A. AVAKIAN

BY

Davis, Hoxie, Faithfull & Hapgood
ATTORNEYS.

United States Patent Office 3,283,147

Patented Nov. 1, 1966

3,283,147

ENERGY-PROJECTING AND SCANNING APPARATUS

Emik A. Avakian, 92 Juana St., Crestwood, N.Y.

Filed May 9, 1962, Ser. No. 193,554
9 Claims. (Cl. 250—52)

Figure 1:
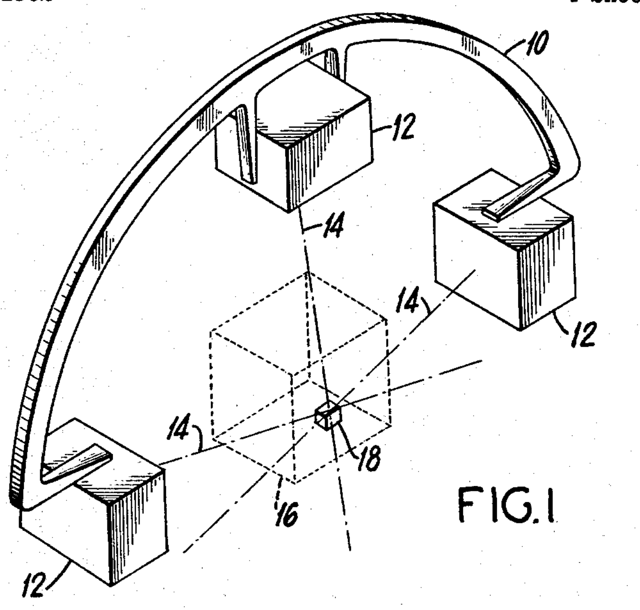

My invention relates in general to the field of directing an energy source and, in particular, to means for accurately positioning a small volume of intense energy at any desired position within a larger volume and means for moving this small volume within that larger volume along any predetermined path.

One form of my invention employs a single narrow beam, or pencil, of energy which is directed perpendicularly from the periphery of a rotating disc. Normally, with such an arrangement, the locus of the revolving beam would describe a cylinder of revolution. However, I arrange the rotating disc within a gimbal mounting such that the disc may be oriented about two rectangular coordinates which lie in a plane parallel to the surface of the disc. Movement of the disc about these two coordinates is controlled by scanning motors. The motors are electronically controlled to orient the rotational axis of the disc into alignment with the subject matter to be irradiated at a point somewhere in space. Nutating or nodding modulation voltages are applied to the scanning motors in synchronism with the rotational speed of the disc so that the disc will wobble sufficiently to direct the beam to always pass through the same point in space regardless of the angular position of the disc. In this manner the beam is caused to describe a pair of inverted cones whose apices intersect at the desired point in space. The distance between the disc and the selected point in space is determined by the magnitude of the nutating voltages. By modulating the scanner motors with asymmetrical voltages, one may move the point of the intersecting beams off the axis of rotation to any desired degree, giving rise to a modified conical scanning configuration.

The D.C. position command voltages of the scanner motors may be varied at will to steer the beam cross-over or intersection point to any radial position in space, and the magnitude of the nodding voltages may be controlled to move the cross-over point inwardly or outwardly along the selected radial line. Obviously, these voltages may alternately be controlled in such a manner as to cause the cross-over point to move continuously or to move in steps along any three-dimensional path. Likewise the intensity of the beam may be varied in accordance with command data in any desired manner as the cross-over point is moved in space.

In another form of the invention there are a plurality of such energy sources. The locations of the individual energy sources lie in at least two different planes and their individual energy beams are arranged to be independently deflected in two or more rectangular coordinates. There are means whereby all the coordinates of all the beams may be controlled together to coordinate the deflection of individual beams so that the multiple beams will intersect at a designated volume in space. This volume will hereafter be referred to as the "volume" of coincidence." The objective being to have a single volume of coincidence wherein the intensity of the energy would be many times greater than the energy of an equal volume irradiated by but a single beam.

In a further embodiment of my invention there are a plurality of parallel beams radiating perpendicular to a common plane. In this version several such groups of coplanar irradiators are set perpendicular to each other so that a set of beams, consisting of a single beam from each plane, all intersect at a common point to form a volume of coincidence. These sets of volumes form a three dimensional lattice. Control means are provided whereby only select beams in each plane are energized in a prearranged sequence whereby the point or volume of intense energy may be shifted, in steps, to any position within the lattice. This third version of my invention differs from the above versions in that here, the individual beams are neither moved nor deflected, scanning control being effected by merely energizing select sets of beams rather than by beam displacement or deflection as in the previously described forms.

In the discussions above it has been assumed that both the instrumentalities and the subject matter are stationed in fixed positions so that there is no relative movement between the objects. If desired, the scanning may be programmed to take into consideration any relative movement between the beam source or sources and the subject matter.

A common feature of my invention, as embodied in each of the above described versions, is means for controlling the beam intensity of each individual beam separately or as a group of beams collectively. This and other features permit a displacement of a small volume of energy within a given larger volume both in time as well as in space, so that the small volume can be controlled to have the intense energy scan through the larger volume in any type of pulsating fashion in the same point in space or at any point within the larger volume.

A further feature of my invention utilizes any one of a multitude of automatic program control means ranging from punched cards or tape, magnetic tape or a complex of online large scale data processors to control both the amount of energy at the volume of coincidence and the displacement of the volume of energy within the volume of interest. There may also be manual controls to manually adjust the radiation intensity and positioning of this high energy concentration to the desired volume of coincidence. The manual controls may or may not be associated with automatic controls. The selected incremental quantities of both the position of the volume of coincidence and the intensity of the irradiation can be stored in the memories associated with the automatic controls for later automatic sweep control of the beams in any predetermined path in prescribed amounts.

Another feature of the invention resides in a novel manual beam director whereby an operator may manipulate an optical pointer or light beam to any desired position on a three dimensional map and the scanning unit or units will automatically position themselves to concentrate the energy beam or beams at a corresponding point in the actual three dimensional subject matter.

Where conical scanning is utilized the scanning head may be provided with sighting rods to assist in aligning or checking the alignment of the scanning head.

Thus my invention provides means to control a source or sources of intense energy so that any point or points, within a large volume, may be irradiated by manual or automatic control of the displacement, in time and space, and of the intensity of the energy anywhere within the large volume.

In the field of biological therapy it is known that the partial or total destruction of either animal or vegetable tissue can promote the alleviation of certain undesirable effects or characteristics of the tissue. A common illustration would be the destruction of tumorous or cancerous tissue in humans.

In another area of biological research it has been demonstrated that certain neuro-muscular disorders in humans may be alleviated, either temporarily or permanently, by the creation of biological lesions within the human body and particularly within the brain. Formerly, such lesions have been created either by the injection of alcohol, via small diameter tubes, or by utilization of ultra-sonic energy. Insertion of these small tubes into the inner reaches of the brain is a particularly hazardous technique, as the risk of puncturing blood vessels and intervening tissue, which tend to create blood clots and other harmful side effects, is high. With this technique the tubes have to be withdrawn and reinserted each time two or more non-contiguous lesions are to be made, thus compounding the hazards. Where ultra-sonic energy therapy is utilized it requires that the subject tissue and the ultra-sonic transducer be immersed in a common bath of saline solution. This technique requires removal of large portions of the skull, and is thus time consuming and a perilous procedure at best.

In the field of physics and electronics there have been recent advancements in the art of electromagnetic wave generation by the development of a class of devices known as masers or lasers. These devices are capable of generating very fine beams of intense energy. Certain of these devices create pencil beams having cross sections as small as .05 cm. as measured at a distance of 10 centimeters from the source.

By the utilization of maser beam generators as sources of therapeutic energy in association with the scanning circuits described above, it is possible to direct the energy to any desired position within the brain or other biological specimen under investigation. By utilization of multiple beams, the energy level of any individual beam may be maintained at or below the threshold of tissue damage, to insure that intervening tissue in the path of the beam remains unaffected. However, the combined energy level at the selected volume of intense energy would originally be maintained at such a level as would only cause temporary lesions in order to ascertain that the desired or expected result might be obtained. Once it has been determined that the location is correct and that the temporary lesion produces the desired effect, the energy of the individual beams may be increased until a permanent lesion is achieved, still without causing damage to the intervening tissue.

By the utilization of such a generator and the technique, specific areas in tissues such as the brain, can be momentarily irradiated to cause temporary rather than permanent effects. In this way the specific functions of these areas can be determined by biological researchers and thus investigation in functional physiology can greatly be accelerated. The living organism can thus give direct evidence of the functions of minute areas within the body such as brain centers.

The apparatus of my invention would also be useful for controlling pencil beams of electro-magnetic radiation within the visible or near visible spectrum. By such means, controlled by a pre-programmed computer, it would be possible to plot specified micro-images on photosensitive surfaces such as film or sensitized metallic surfaces common to the field of printed circuits as well as the field of photographic recording of information.

The apparatus could also be adapted directly to the field of printed electrical circuits where sufficient quantities of energy are available to vaporize thin metallic films. By such a technique, printed circuit boards having a thin metallic film bonded to an insulated surface could be directly produced in a one step operation by a pre-programmed apparatus which would vaporize the undesired metal.

The apparatus may also find utility as a welding or cutting device for performing these functions at any point within a nearly closed volume by directing one or more beams into the cavity via small access ports. In this manner the energy could be concentrated at the desired point without fear of damage to adjacent material.

Figure 2:
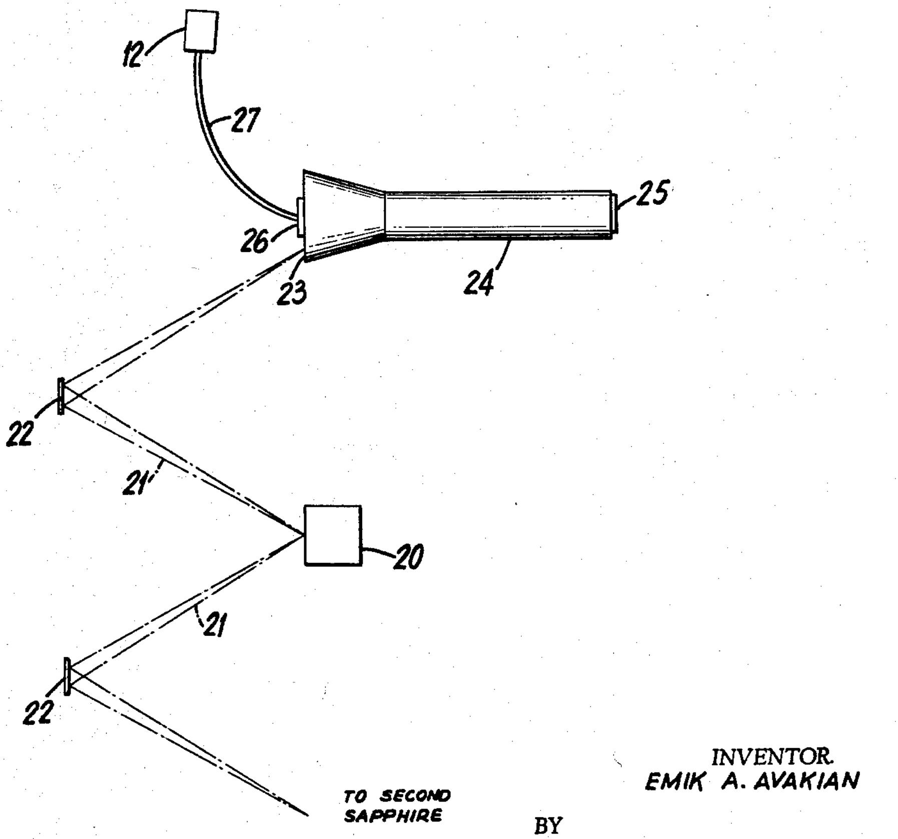
Figure 3:
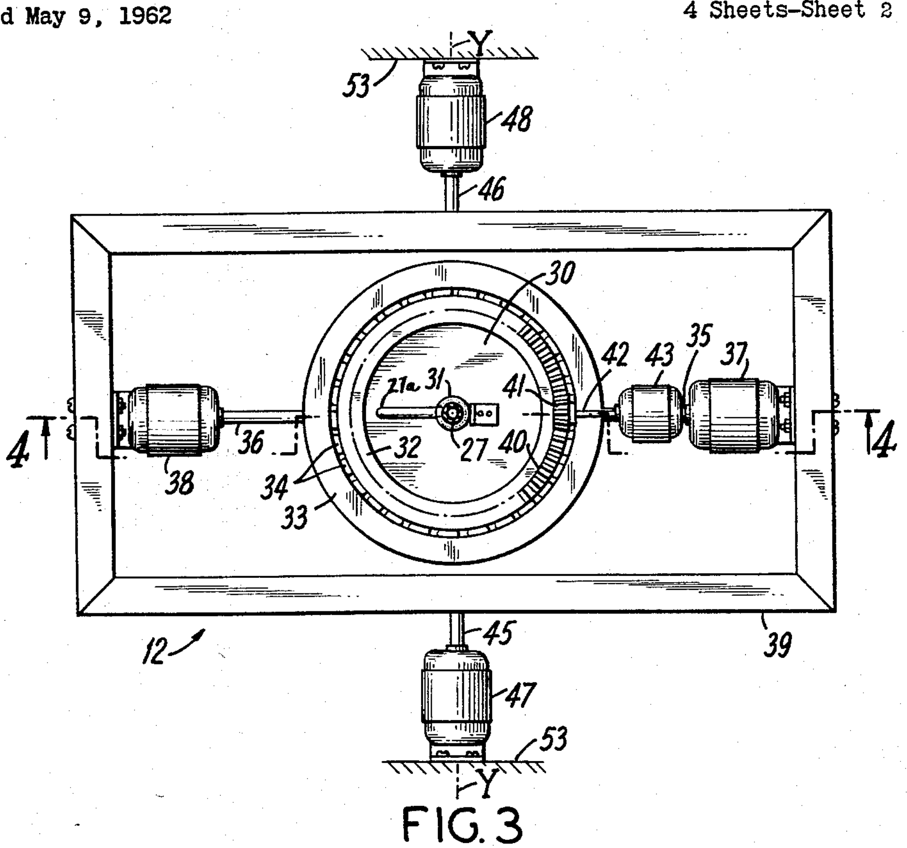
Figure 4:
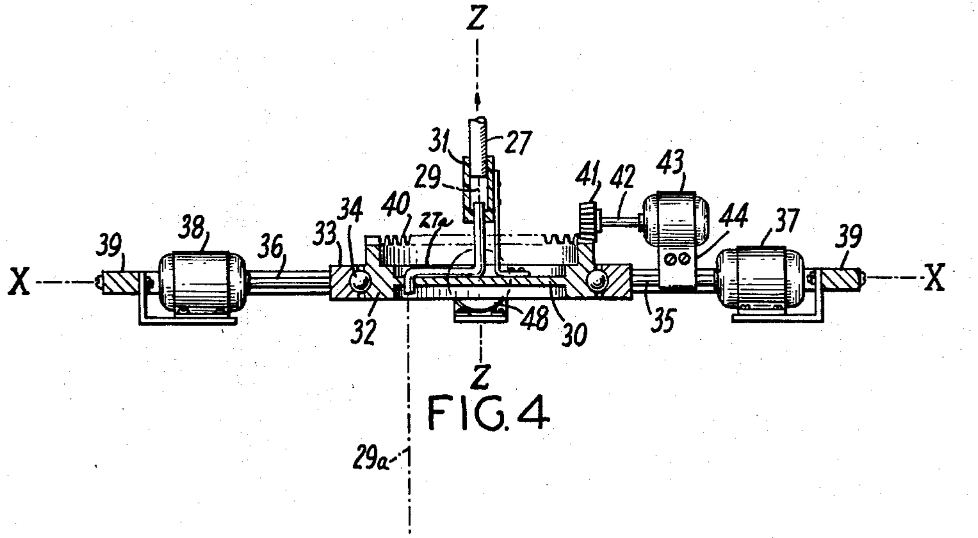
Figure 5:
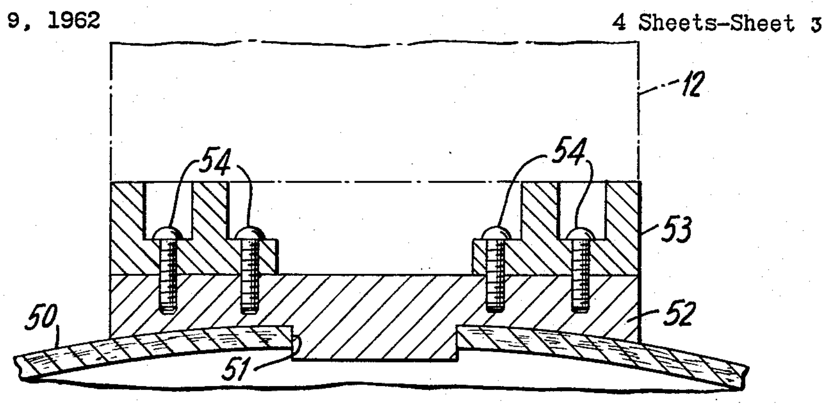
Figure 6:
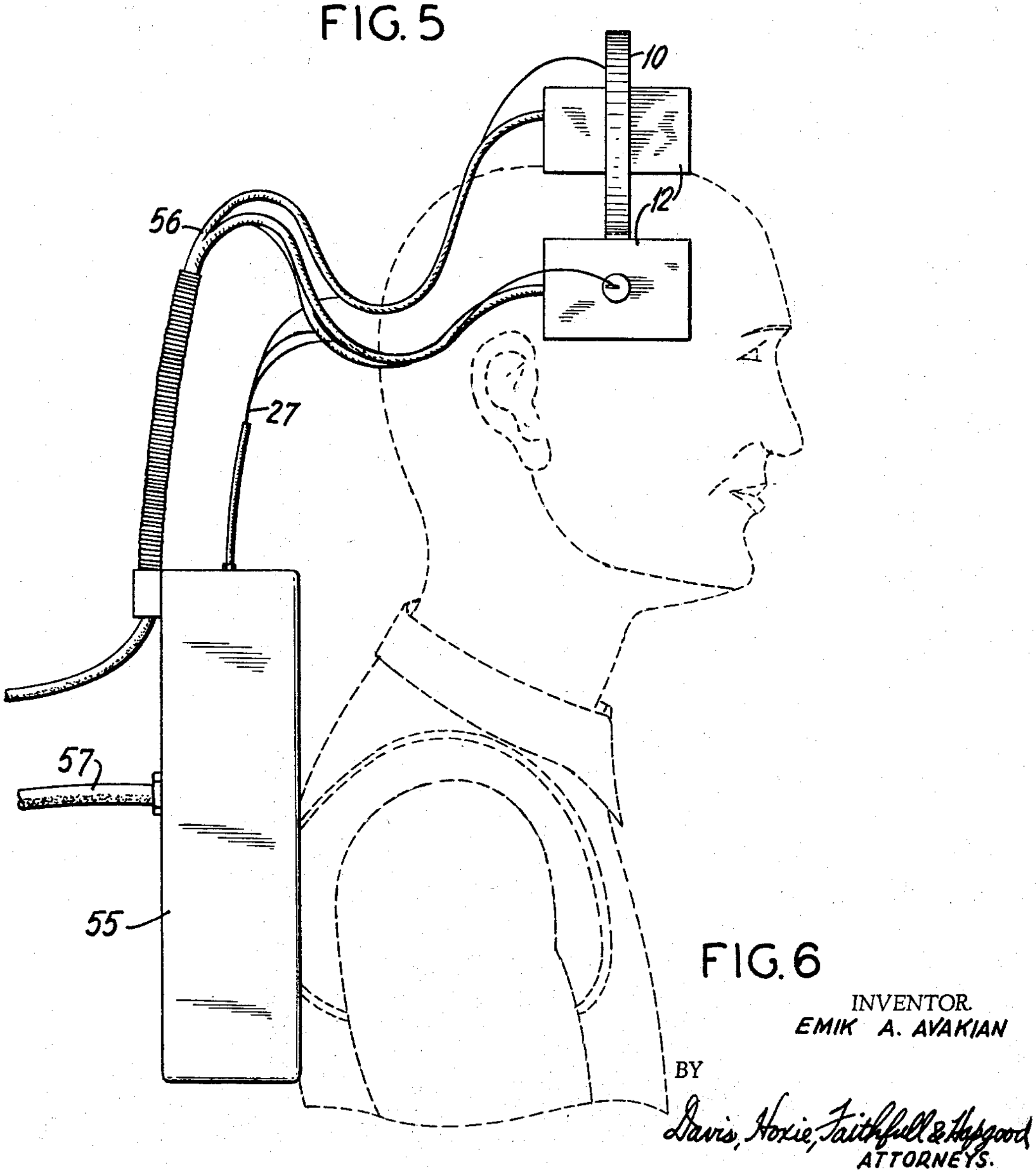
Figure 7:
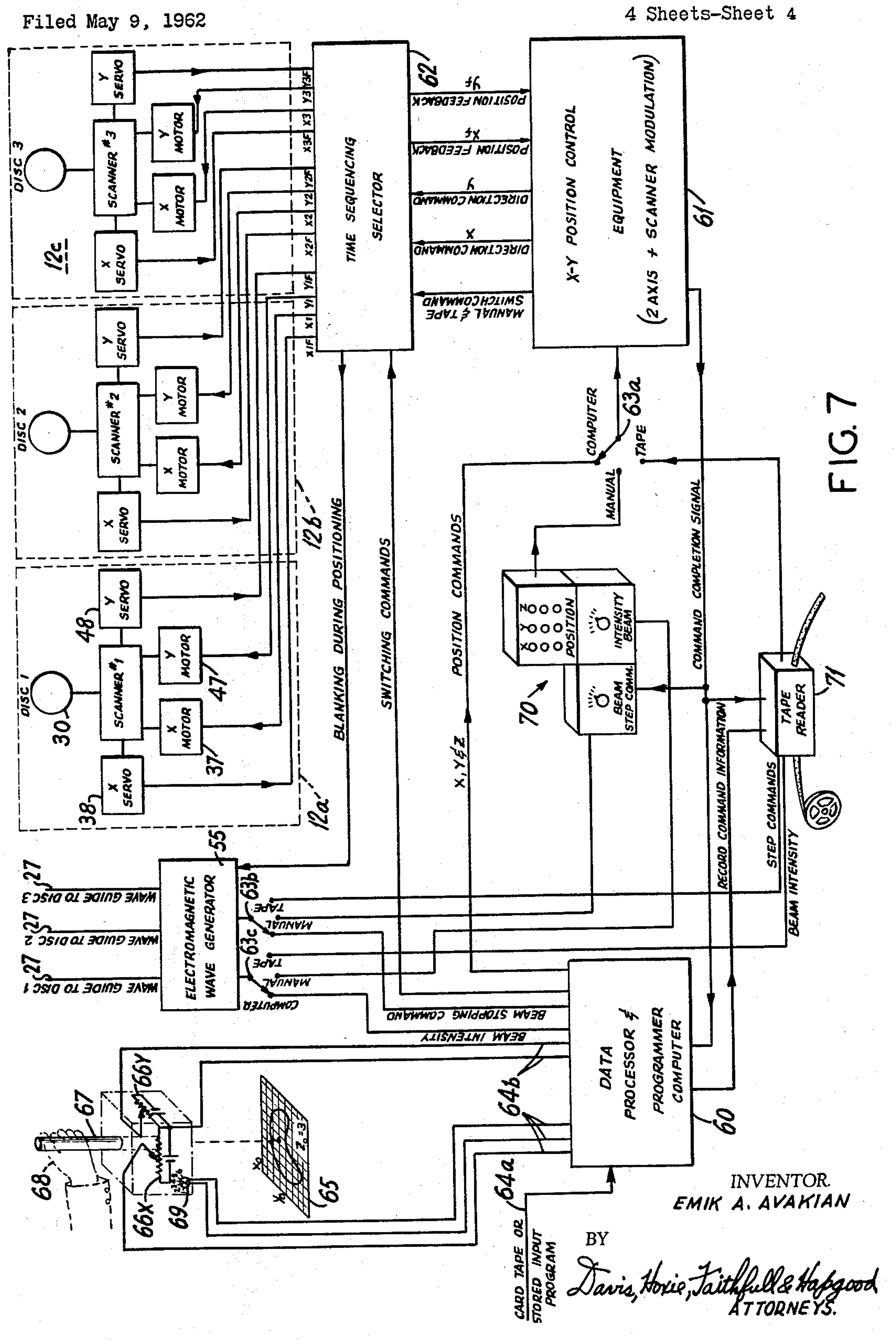

The apparatus will be hereinafter described with reference to the attached drawings, of which;

FIG. 1 illustrates, schematically, an apparatus having three independent directable sources of energy capable of irradiating a specified volume of coincidence within a larger volume of interest, and FIG. 2 illustrates, schematically how a plurality of physically displaced lasers may be energized from a common energy source, and FIG. 3 is a plan view of a beam sweep control mechanism for controlling a laser beam created in accordance with FIG. 2, and FIG. 4 is a sectional view taken along line 4—4 of FIG. 3, and FIG. 5 is a sectional view illustrating a method by which the scanning control unit may be attached to the skull of a human being, and FIG. 6 is a view of a human illustrating how the control apparatus may be attached for treatment, and FIG. 7 is a schematic electrical block diagram of a complete system.

As illustrated schematically in FIG. 1, three irradiators 12, secured to a supporting frame 10, are arranged to be positioned in three different planes disposed perpendicularly to one another and disposed to direct their individual pencil beams of energy 14 towards a volume of interest 16. By exercising coordinated control of the deflection of the beams 14, they may be caused to intersect one another at a particular volume of coincidence 18 within the larger volume of interest.

FIG. 2 illustrates the preferred method by which the individual beams 14 of FIG. 1, may be generated or formed from a common energy source 20 of electromagnetic energy which, as illustrated, radiates from the generator in diverging beams 21. For the sake of brevity in the illustration in FIG. 2, and to minimize confusing multiplicity only two beams 21 are shown emerging from the generator 20 where in reality as applied to the FIG. 1 assembly there are three beams formed in the manner shown, which are fed to the three irradiators 12. The three beams 21 are focused and reflected by focusing mirrors 22 onto the front surface 23 of a sapphire-ruby laser 24.

The theory of laser operation having recently attained an independent status in the electromagnetic art will not be described herein, but reference may be had to many recent articles on the subject in professional and trade journals.

As is well known, the laser is provided with a reflecting mirror 25 at one end, and a semi-transparent mirror 26 at the other end through which the very fine pencil beam of energy emerges. This emitted energy is conducted, via the flexible waveguide 27, into the deflection and scanning units 12 of the apparatus of FIG. 1. Where desired, there may be a multiplicity of waveguides 27 leading from a single laser to form multiple sources of energy in a single plane of radiation at the control unit. The extremely short wavelength of the energy utilized lies in the band of from one one-thousandth to one-tenth of a millimeter and, as is well known, this energy has properties somewhat similar to light waves as well as radio waves. For this reason, the flexible waveguides may be in the form of optic fibers well known in the art.

FIGS. 3 and 4 illustrate, schematically, a preferred form of one of the scanning or sweep control units 12 of FIGS. 1 and 2. FIG. 3 is a view of the control unit 12 as seen looking toward the volume of interest, whereas FIG. 4 is a sectional view of the device as taken along lines 4—4 of FIG. 3.

The output end of the waveguide 27, leading from the laser 24, is arranged to transfer the beam 29 to a second flexible waveguide 27a which is an integral part of the scanning unit 12. The waveguide 27a is mounted for rotation on a disc 30 and is arranged to receive the energy beam 29 along the stationary axis of rotation of the disc. The waveguide 27a conducts the beam outwardly along the radius of the disc 30 and projects it through a hole in the disc along a path 29*a* parallel to the original path 29 but displaced laterally therefrom. As the disc 30 rotates, the locus of the revolving beam would describe a cylindrical pattern. The disc 30 is disposed within the inner cavity of a ball bearing assembly having an inner race member 32 which is adapted for rotation within an outer race 33. Between the races 32 and 33 are a complement of rolling elements or balls 34. The outer race 33 is connected to the shafts 35 and 36 to form a gimbal. Shaft 35 is the rotor shaft of a motor 37, whereas shaft 36 is the rotor shaft of an electric follow-up or servo feedback device 38. The motor 37 and follower 38 are supported within an open frame 39. I term the axis of shafts 35 and 36 as the "X" axis. The rotation of disc 30 on the axis I term the "Z" axis, within the framework 39, is effected by providing circumferential teeth 40 on the upper surface of the inner race 32 which engage corresponding teeth on the gear 41 attached to the shaft 42 of spinner motor 43. Motor 43 is supported by brackets 44 fixedly attached to shaft 35 and is thus adapted to rotate with the disc assembly.

The frame 39 is similarly arranged to be rotated in gimbal fashion about another axis, which I term the "Y" axis, which is displaced 90 degrees from that of shafts 35 and 36, or the "X" axis. For that purpose the frame 39 is affixed to shafts 45 and 46 respectively of another motor 47 and servo feedback unit 48 or position follower. The units 47 and 48 are mounted upon a platform 53 which remains stationary with respect to the other elements of the scanner assembly.

To insure that the flexible waveguides 27 and 27*a* remain in alignment with each other as the waveguide 27*a* is oriented to different positions, the upper end of waveguide 27*a* is provided with a bushing 31 suitably mounted from the disc 30. The end of the flexible waveguide 27 is slidably disposed within the bushing so that rotary motion of waveguide 27*a* is not transmitted to the waveguide 27.

By way of example of the operation of the scanner, assume that it is desired to scan a point somewhere along the Z axis. As the disc 31 is rotated by the spinner motor 43, motors 37 and 47 are oscillated back and forth in synchronism with the spinner motor to maintain the beam constantly upon the selected spot on the Z axis. The locus of the beam will then describe a conical shape converging from the disc 30, to the point. The control voltages for the X and Y scanner motors would then be in the form of two sine waves displaced 90° in phase. These control voltages may be generated in electronic control circuits similar to those found in radar scanners, or they may be generated from a pair of endless revolving sine and cosine potentiometers driven by the shaft of the spinner motor. These displaced sinusoidal voltages are impressed upon the steady D.C. voltages which dictate the center positions on the X and Y axis about which the motors oscillate to maintain the beam on the chosen volume of coincidence at every position of the rotation of the disc.

The position followers 38 and 48 may be of any well known analog type such as a synchro or a resolver or they may be of the digital type. The purpose of these feedback units is to feed back a position error signal indicative of the displacement of the disc 30 between its actual position and its commanded position. When such an error signal exists it directs the proper motor control circuit to cause the motor to rotate in a direction to reduce the error signal towards zero. When the error voltage reduces to zero, or arrives at a pre-set dead band, the driving motors stop turning continuously but remain oscillating about the commanded position to keep the rotating conical beam 29*a* aimed at the chosen site.

The motors are under control of an initial position command signal which may be manually set or automatically set by a pre-set program contained within a storage media such as punched cards, punched tape, magnetic tape or any of the well known storage devices. From this it may be envisioned that the beam 29*a* may be continuously directed to intersect a given point in space and thus irradiate that point continuously, whereas any other point in the volume merely receives a fraction of the energy as the beam rotates through the other point or points outside of the desired volume. This method of scanning precludes the damaging of material outside the volume of coincidence by maintaining the level of bombardment below the threshold of injury.

The amplitude of the phase displaced scanner motor sinusoidal modulation voltages, which I term the nutating or nodding voltages, may be controlled in any desired manner to cause the point of intersection of the beam and the Z axis to move inwardly or outwardly along the Z axis, or they may be made asymmetrical so as to shift the point of common intersection away from the Z axis if desired.

The superficial explanation of the positioning control circuitry is given merely for illustrative purposes. Examples of particular systems which will generate *x–y* motor command signals in response to information stored on punched cards or tape may be found in U.S. Letters Patent Numbers 2,764,720 and 2,848,670 issued to L. U. C. Kelling.

The form of the embodiment of the invention, as illustrated in FIGS. 3 and 4, may be altered slightly if it is desired to dispense with the scanner motor nodding modulation voltages. In that case, the waveguide 27*a*, disposed on the disc 30, may be replaced with two reflecting devices, such as mirrors. The first mirror would be stationed at the center of the disc 30 and would be oriented at an angle of 45° with respect to the plane of the disc to reflect the beam towards the periphery of the disc. A second mirror or reflector would be disposed near the edge of the disc 30 and oriented to intercept the reflected beam and redirect it outwardly from the face of the disc. In this event, the second reflector would be adapted to be angularly adjustable to cause the beam to intersect the axis of rotation at any desired distance from the disc. The angular adjustment of the second reflector may be accomplished by a third servo positioner which obviously would be labeled the "Z" axis positioner.

It will be obvious to those versed in the art that the results would be identical with those of the FIG. 3 and 4 form of the invention, although the mechanical arrangement and electronic circuitry would be slightly different. This alternative is set forth merely as illustrative, and I prefer the embodiment illustrated and discussed above in reference to FIGS. 3 and 4.

At this point I wish to clearly point out that the media into which the energy is focused and projected must have an absorption characteristic relative to the wavelength of the energy. If the media were transparent to these wavelengths there would be no dissipation of energy at the volume of coincidence nor at any point within the media. Conversely, if the characteristic of the media were such that the energy could not penetrate it to any great degree, as may be the case with thick metallic films, the volume of coincidence would not receive any irradiation at all.

While it may be experimentally determined in the future, as regards to medical applications of the device, that the human skull itself has an attenuation vs. wavelength characteristic having spectral "windows," or points along the frequency spectrum at which the beam will pass through it substantially unimpeded, it must be determined whether the brain tissue, at such frequencies, has the proper absorption characteristic to properly dissipate the energy. In the event that the skull is not found to be substantially transparent at the proper tissue frequency I propose to modify the skull of the patient in accordance with the illustration in FIG. 5.

The skull 50 is provided with a surgical aperture 51 by means well known to skilled medical-surgical experts. Into this aperture 51 is disposed a non-metallic plate 52 of inert material such as plastic, which has no deleterious medical or chemical effect but which is substantially transparent to the beam of electro-magnetic energy. Desirably, the plate 52 should have a curvature converse to that of the skull and be bonded to the skull plate 50 to preserve the proper medical and sanitary precautions as well as maintaining a fixed mechanical relationship with the skull. The base 53 of the scanning unit 12 of FIG. 1, would be securely attached to the plate 52 as by the screws 54, but is removable during periods of disuse.

FIG. 6 illustrates the feasability of attaching the three beam deflection units 12 to the head of a person whose skull has been modified in accordance with FIG. 5. The laser beam generating equipment of FIG. 2 is disposed within a pack 55 on the back of the user. The waveguides 27 interconnect the head and pack units. The pack unit may be powered from a local source of energy via the cable 57. The position command signals for the scanning control units 12 are introduced via cable 56, which also carries the return signals from the servo followers 38 and 48 of each of the units 12 to the position control equipment.

The specific electronic circuitry for converting prestored scanning commands from punched cards, tape or any other of the well known data storage media into the proper form to control the positioning disc motors 37 and 47 is well known in the field of positioning such as for example the "General Electric Mark II," Positioning Control Equipment.

The discrete input position commands to such an electronic positioning control equipment may be from an electronic computer or data processor of any of the well known commercial types which has been adapted to compute the desired positional command signals in accordance with a predetermined program. A fourth controllable variable for each scanning unit is the intensity of the beam or beams, which is similarly controlled from the master program.

A simplified electrical block diagram of a complete system is illustrated in FIG. 7.

In the drawing three beam control units **12*a*, 12*b* and 12*c* are shown in the upper right corner. The X and Y motor direction commands, originating in the position control equipment 61 are distributed to each of the scanners via the time sequence selector 62. Since only one three-axis position controller is utilized, it is arranged to supply, on a time sharing basis, 3 complete sets of X–Y commands in sequence. The time selector 62 also supplies beam-on or beam-off commands or blanking signals to the wave generator 55**.

The X–Y position controller 61, as stated above, is provided with a switch **63*a***, *b* and *c* which determines whether its input commands shall be from a Data Processor 60, a manual control box 70 or a tape reader 71. Under manual control there are 5 commands which may be pre-set. They are: *x* position, *y* position, *z* position, beam intensity and beam stepping. Under tape control these same basic base commands are provided in each block of tape. Under computer control these same commands are supplied by the computer 60.

Where the computer 60 is utilized as the master programmer, it may likewise be under control of either automatic or manual input data **64*a* or 64*b***.

One form of manual control suitable for the purpose is illustrated in the block diagram of FIG. 7. At the upper left corner of the diagram will be seen a pin-point light beam producing wand or pointer 67 adapted to be maneuvered by the technician 68 and directed onto a grid map or image matrix of a human brain 65 which has been prepared for a specific Z dimension, noted as Z=3. The pointer 67 is disposed within a frame containing mechanical linkages connected to the arms of X and Y potentiometers **66*x* and 66*y*. For any given position of the pointer 67, specific X and Y control voltages will be established and fed to the computer for analyzing and computation of the corresponding position command signals for the position controller 61. Also in the frame is a Z dimension selector 69 calibrated in accordance with the Z dimension of the preselected slide or image matrix 65**.

A further refinement in this area would be the addition of a servo feedback link between the scanning control units 12 and a directable pin-point light source that would display a light spot on the same matrix and image grid 65. This could be used as a visual check of the scanning apparatus 12 to determine, prior to energizing the beam, whether all the automatic and/or manual controls were functioning as desired.

It should be pointed out that the scanning action of the individual units **12*a*, 12*b* and 12*c*** in the block diagram is in reality three dimensional scanning. The three dimensional point in space at which the three beams intersect may be defined accurately by the proper selection of each of the two *x* and *y* scanning motor coordinates as well as the Z coordinate as determined by the magnitude of the nodding voltages for each of the three or more scanners employed. The determination of the proper nine or more unknown values is performed automatically by the data processor unit from input information in the form of but three rectangular coordinates I choose to call X*o*, Y*o* and Z*o*. By assigning arbitrary units of measurement to the X*o*, Y*o* and Z*o* commands, it is recognized that a three dimensional lattice may be fabricated representing a volume of interest such as the human brain.

As individual human brains vary in size and shape, some determination of the three dimensional aspects of the specific brain must be had prior to treatment. This can probably best be effected by studies of X-ray images of the particular brain as taken from a series of positions such as, front to back, back to front, left side to right side, right side to left side and angular positions therebetween. From an analysis of the images a three dimensional image of the brain may be recreated and corelated with the arbitrary lattice. By one method, one could formulate a series of images 65 in say the X–Y plane, as shown in FIG. 7. Here then would be a series of such plates each having a particular Z*o* dimension which could be manually inserted into the data processor 60 by the manual setting of the selector switch 69.

In a different embodiment one could create, from the analysis of the X-ray images, a physical three-dimensional replica as by casting it in transparent plastic. This could be inserted in a holding jig specially formulated for the task. This jig could be provided with three scanners, which duplicate the three treatment scanners 12, positioned about the replica identically with the treatment scanners. They would be adapted to direct simple light beams, possibly of different color into the replica. They would be manually directable by the technician to the proper spot within the replica. Positional signals from the simulated scanners would feed to the computer 60 to direct the treatment scanners 12, or they could be interconnected directly as in the case of optical gun directors that direct a battery of anti-aircraft guns.

Provision is made when the data processor is utilized to record all issued commands on the inactive tape reader 71 for future use.

Provision may also be made to include in the data processor program position, coordinate data concerning certain danger zones which should never be subjected to bombardment by the intense beam of energy. In this case, whether either the manual commands or the stored commands in error, or where scanning from one position to another would cause the beam to infringe upon a danger zone, the beam would be automatically cut-off or reduced to a safe level.

The above described apparatus may also find utility in providing a more precise method of mapping the positions of the various brain functions where no permanent lesions are to be made. These techniques may also prove beneficial in the investigation of causes and cures of mental disorders without resort to major brain surgery.

The complexity of modern date processing equipment may preclude its use in such a circuit as that shown in the block diagram of FIG. 7 for economic reasons. In that event I propose to use, in my system, data processing equipment located elsewhere, and communicate the data from the laboratory to the processing equipment and return by a data communication link. As an example of the highly developed state of the art in data communication reference may be made to a paper on that subject written by Levine, Harrison and Avakian which was presented at the January 31, 1962, IRE General Meeting and classified as No. CP–62–413. A system such as described therein would permit a remotely situated large scale computer complex, not specifically designed and constructed for the present purpose, to be utilized at any time, even though it might well be processing other routines simultaneously. The demand on such a processor complex would be similar to those made on data processing complexes for missile and satellite guidance and control.

I claim:

1. Apparatus for bombarding with coherent electromagnetic wave energy any selected volume of coincidence within a larger volume of matter which partially transmits and partially adsorbs said electromagnetic energy waves comprising, a plurality of directable pencil-beam generators of coherent electromagnetic wave energy; said generators being disposed at preselected positions around said larger volume; beam directing means for said generators; a three-motion position controller; said controller being adapted sequentially to issue direction orders for each of said directing means in response to direction commands; a time sequencing selector adapted to sequentially receive said direction orders and transmit them to the respective beam directing means; and a data processor for generating direction commands from a program based upon a preselected set of coordinates assigned to said larger volume, and said generated means for issuing commands to said position controller.

2. The apparatus of claim 1 wherein the program of selected coordinates assigned to the volume of interest are issued to the data processor from previouly stored data.

3. The apparatus of claim 1 wherein the program of selected coordinates to be issued to said data processor are determined by manual means.

4. The apparatus of claim 3 wherein the manual means comprises a three dimensional transparent rectangular coordinate grid, a three dimensional map of the volume of interest superimposed upon said grid, a pin-point source of light adapted to be directed towards any selected portion of said map and grid, and apparatus adapted to generate signals proportionate to the values of each of the coordinates pinpointed by said light, whereby said data processor receives program data identifying the desired position of the volume of coincidence and computes positional commands for said three-motion positioner.

5. Coherent energy electro-optical beam scanning apparatus for concentrating coherent radiant energy at a preselected point of coincidence within a volume of a material which partially absorbs energy of the beam transmitted therethrough, comprising in combination, (A) a source of electro-magnetic wave energy radiation wherein the radiant waves are substantially in phase with one another and form a narrow pencil beam, (B) means for moving the beam from said source througgh a repetitive path constantly including any preselected point of intersection within the volume of material remote from said source, and (C) adjustable means for varying the direction of said beam moving means to change the locus of said intersection point within the material volume, whereby the cumulative concentration of coherent radiant wave energy at the selected internal point of beam intersection is substantially greater than the beam intensity at any other point within the volume.

6. The combination of claim 5 wherein said adjustable means is operated by a preset program controller.

7. The combination of claim 6 and means for varying the intensity of beam radiation from said source.

8. An electromagnetic wave energy irradiator system for bombarding any preselected volume within a three dimensional volumetric lattice with a more intense amount of electromagnetic wave energy than any other volume within the lattice comprising, a plurality of electromagnetic wave energy sources each generating a pencil beam of coherent electromagnetic wave energy, at least two of said sources being disposed in selected positions about said lattice to direct their respective beams along paths intersecting at any selected point within said lattice, and sequencing means for selectively causing said beams to converge upon and irradiate any preselected volume within the lattice.

9. An electromagnetic wave irradiator system for bombarding any preselected volume within a three dimensional volumetric lattice with a more intense amount of electromagnetic wave energy than any other volume within the lattice comprising a plurality of electromagnetic wave generators each adapted to generate pencil beams of electromagnetic wave energy, said generators being disposed on a common plane and having their respective beams directed towards said lattice, two other sets of similarly arranged generators disposed on other planes which are angularly displaced from each other and from said first plane, said three planes being disposed about said lattice, one beam generator on each of said planes being adapted to direct its beam to bombard a specific volume within said lattice, whereby when specific beam generators of each of said planes are selectively energized any preselected volume within the lattice may be bombarded during the beam energization period.

References Cited by the Examiner

UNITED STATES PATENTS

| | | | |
|---|---|---|---|
| 2,139,966 | 12/1938 | Loebell | 250—61.5 |
| 2,640,159 | 5/1953 | Gerneth | 250—61.5 |
| 2,793,296 | 5/1957 | Peterson | 250—61.5 |
| 2,989,614 | 6/1961 | Steigerwald | 219—121 |
| 3,002,260 | 10/1961 | Shortt et al. | 29—155.5 |
| 3,011,247 | 12/1961 | Hanlet | 29—155.5 |
| 3,056,881 | 10/1962 | Schwarz | 29—155.5 X |
| 3,091,692 | 5/1963 | Verse | 250—61.5 |
| 3,159,778 | 12/1964 | Gavreau et al. | 318—162 |

RALPH G. NILSON, *Primary Examiner.*

GEORGE N. WESTBY, ARTHUR GAUSS, *Examiners.*

D. E. SRAGOW, A. L. BIRCH, *Assistant Examiners.*

UNITED STATES PATENT OFFICE
CERTIFICATE OF CORRECTION

Patent No. 3,283,147 November 1, 1966

Emik A. Avakian

It is hereby certified that error appears in the above numbered patent requiring correction and that the said Letters Patent should read as corrected below.

Column 1, line 59, for "deflection" read -- deflections --; line 61, for "volume" of" read -- "volume of --; column 8, line 68, for "whether" read -- where --; column 9, line 27, for "adsorbs" read -- absorbs --; line 40, strike out "said generated" and insert the same, before "commands" in line 41, same column 9; column 10, line 4, for "througgh" read -- through --.

Signed and sealed this 5th day of September 1967.

(SEAL)
Attest:

ERNEST W. SWIDER
Attesting Officer

EDWARD J. BRENNER
Commissioner of Patents